US007928158B2

(12) United States Patent
Rodak et al.

(10) Patent No.: US 7,928,158 B2

(45) Date of Patent: Apr. 19, 2011

(54) CARBOXYLIC ACID/ANHYDRIDE COPOLYMER NANOSCALE PROCESS AIDS

(75) Inventors: Nicholas J. Rodak, Princeton, NJ (US); Nafih Mekhilef, King of Prussia, PA (US); Thomas Bole, Westlake, OH (US)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 12/375,999

(22) PCT Filed: Jul. 31, 2007

(86) PCT No.: PCT/US2007/074784

§ 371 (c)(1),
(2), (4) Date: Jun. 16, 2009

(87) PCT Pub. No.: WO2008/019253

PCT Pub. Date: Feb. 14, 2008

(65) Prior Publication Data

US 2010/0029835 A1 Feb. 4, 2010

Related U.S. Application Data

(60) Provisional application No. 60/835,756, filed on Aug. 4, 2006.

(51) Int. Cl.

| | |
|---|---|
| ***C08K 3/36*** | (2006.01) |
| ***C08G 18/00*** | (2006.01) |
| ***C08L 77/00*** | (2006.01) |
| ***C08L 31/04*** | (2006.01) |

(52) U.S. Cl. ........ 524/507; 524/502; 524/514; 524/524; 526/317.1; 526/319

(58) Field of Classification Search .................. 524/507, 524/502, 514, 524; 526/317.1, 319
See application file for complete search history.

(56) References Cited

U.S. PATENT DOCUMENTS

| | | | | |
|---|---|---|---|---|
| 4,889,885 | A | 12/1989 | Usuki et al. | |
| 6,287,634 | B1 | 9/2001 | Beall et al. | |
| 6,461,423 | B1 | 10/2002 | Beall et al. | |
| 6,462,122 | B1 | 10/2002 | Qian et al. | |
| 6,632,868 | B2 | 10/2003 | Qian et al. | |
| 6,906,127 | B2 | 6/2005 | Liang et al. | |
| 2003/0144401 | A1 * | 7/2003 | Ajbani et al. | 524/445 |
| 2004/0192794 | A1 * | 9/2004 | Patterson et al. | 521/84.1 |
| 2005/0059769 | A1 * | 3/2005 | Chou et al. | 524/445 |
| 2005/0137288 | A1 | 6/2005 | Maruo et al. | |

FOREIGN PATENT DOCUMENTS

| | | |
|---|---|---|
| EP | 1514842 | 3/2005 |
| WO | WO 02/100923 | 12/2002 |

OTHER PUBLICATIONS

Hasegawa, Naoki, et al., "Preparation and Mechanical Properties of Polypropylene-Clay Hybrids Using a Maleic Anhydride-Modified Polypropylene Oligomer", *Journal of Applied Polymer Science*, Jan. 3, 1998, vol. 67, pp. 87-92 (abstract only).

* cited by examiner

*Primary Examiner* — Michael M Bernshteyn
(74) *Attorney, Agent, or Firm* — Thomas F. Roland

(57) ABSTRACT

The present invention relates to copolymer process aids having a carboxylic anhydride or acid functionality and a hydrophobic functionality. The copolymer process aid can be used in the exfoliation of a nanoclay, where it can be made in situ; and can also serve as a compatibilizer for exfoliated nanoclays with a polymer matrix, including with impact modified polymer matrices.

16 Claims, 4 Drawing Sheets

Compression Molded *in situ* Polymerized PMMA Containing Pristine Laponite Clay.

Curve a = 12452-43-1 [0.784 wt% Pristine Laponite clay]
Curve b = 12452-43-2 [1.96 wt% Pristine Laponite clay]
Curve c = 12452-43-3 [3.92 wt% Pristine Laponite clay]
Curve d = 12452-43-4 [7.84 wt% Pristine Laponite clay]

CARBOXYLIC ACID/ANHYDRIDE COPOLYMER NANOSCALE PROCESS AIDS

This application claims benefit, under U.S.C. §119 or §365 of U.S. Provisional Application Number U.S. 60/835,756, filed Aug. 4, 2006; and PCT/US2007/074784, filed Jul. 31, 2007.

FIELD OF THE INVENTION

The present invention relates to copolymer process aids having a carboxylic anhydride or carboxylic acid functionality and a hydrophobic functionality. The copolymer process aid can be used in the exfoliation of a nanoclay, and can also serve as a compatibilizer for exfoliated nanoclays with a polymer matrix, including with impact modified polymer matrices. The process aid produces composites having smaller nanoscale domain sizes, thereby leading to improvements in material properties.

BACKGROUND OF THE INVENTION

Layered silicate materials (phyllosilicates) can be exfoliated by having monomers sorbed or intercalate between the adjacent platelets of the silicate. Sufficient monomer is sorbed to expand the adjacent platelets, and the intercalate is then easily exfoliated into individual platelets. The exfoliation can occur by the application of a shear force. Monomeric ethers and esters, as well as those with hydroxyl groups can be sorbed directly between the phyllosilicate layers, as shown in U.S. Pat. Nos. 6,461,423 and 6,287,634.

US patent application Ser. No. 2005/0137288, and U.S. Pat. No. 6,906,127 describe a method for forming exfoliates by intercalating a layered silicate material with an oligomer or pre-polymer, and then polymerizing the monomer while in contact with the clay to form a nano-clay modified polyamide or nylon. The amine functionality is protonated for ion-exchange with interlayer cations to bond the intercalant to the phyllosilicate platelet. The intercalated silicate materials are then compounded into a polymer matrix to achieve excellent thermal stability.

Hasegawa et al. showed that oligomeric, i.e. low molecular weight PP-MAH [J. Appl. Polym. Sci. 1998, 67, 87-92] significantly improved the exfoliation of clay platelets with concomitant increases in PP mechanical properties when compounded by extrusion.

U.S. Pat. No. 6,462,122 and U.S. Pat. No. 6,632,868 describe the use of a maleic anhydride modified polypropylene in both the intercalation of phyllosilicates, and in the polymer matrix to aid dispersion.

The use of copolymers as compatibilizing aids between a polymer matrix and different additives are well known. The copolymers tend to increase system miscibility by reducing interfacial tension and promoting adhesion at the interface.

A copolymer having a non-olefinic hydrophobic moiety, and a hydrophilic alpha-beta unsaturated carbonyl moiety has now been found to both act as an intercalation agent for phyllosilicates, and also to act as a compatibilizer between nanoclays, impact modifiers, and thermoplastic matrices.

DETAILED DESCRIPTION OF THE INVENTION

Figure 1:
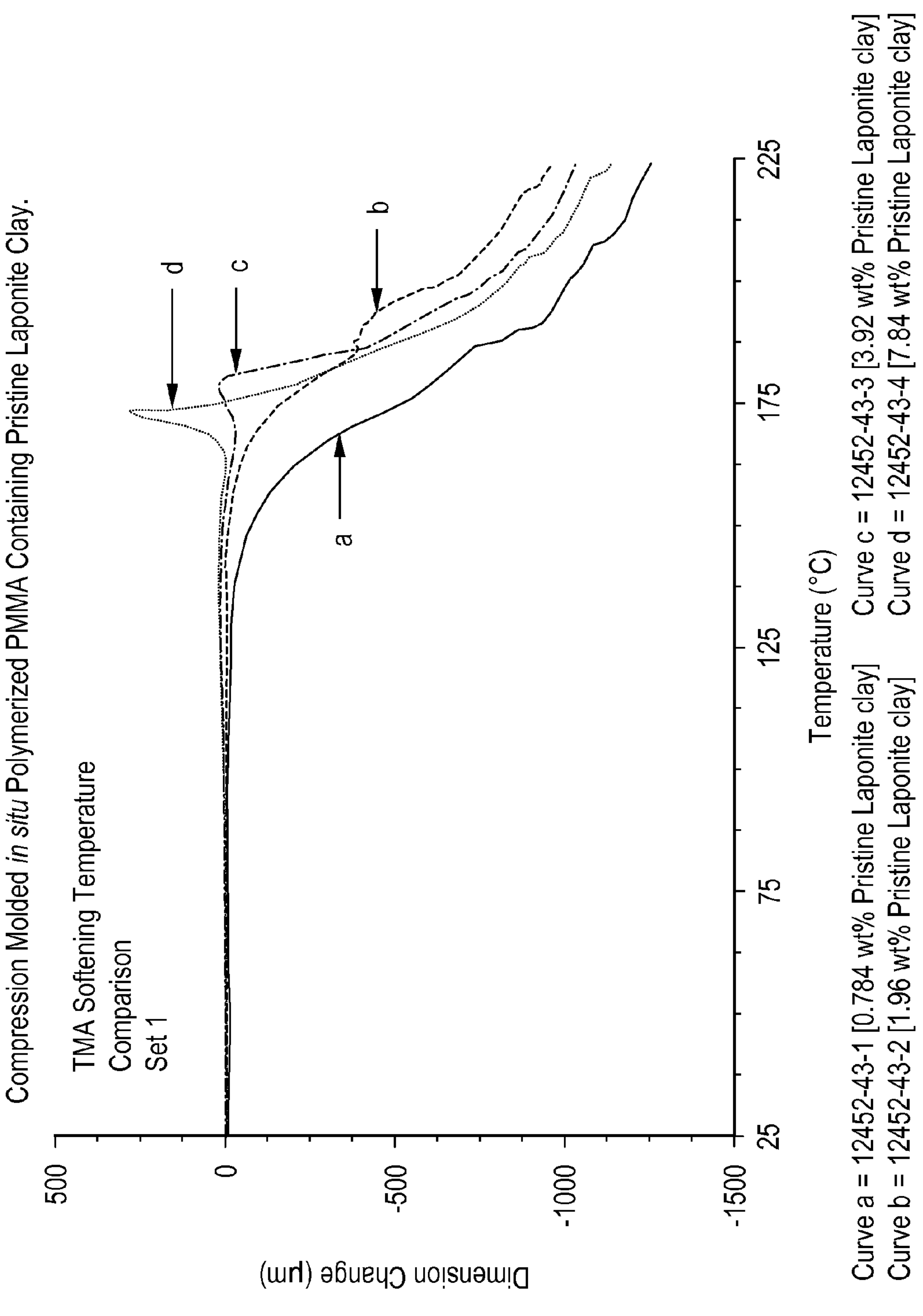
FIG. 1: Thermomechanical analysis (TMA) graph showing dimension change versus temperature of compression molded samples of freshly extruded material containing PMMA and varying levels of pristine laponite clay (curve a=0.784 wt %, curve b=1.96 wt %, curve c=3.92 wt %, curve d=7.84 wt %).

The invention relates to the use of a hydrophilic/hydrophobic process aid in the exfoliation of nanoclays, as well as in the compatibilization of exfoliated nanoclays into a polymer matrix—especially a polymer matrix that contains impact modifiers. By process aid as used herein is meant a (co) polymeric additive that as a result of being added to a base resin composition with or without other additives followed by thermal or mechanical blending and processing results in improved processing parameters and/or thermal, mechanical, and/or optical performance enhancements for that resin material.

Copolymer Process Aid

The copolymer process aid of the invention contains at least one hydrophilic moiety block and at least one hydrophobic moiety.

The hydrophilic moiety of the copolymer process aid is an ethylenically unsaturated carboxylic acid, ethylenically unsaturated carboxylic acid anhydride, or derivatives of the foregoing. Most preferably the hydrophilic moiety is an alpha-beta unsaturated carbonyl. Examples of (di)carboxylic acids and anhydride moieties and their derivatives useful in the process aid of the invention include, but are not limited to maleic anhydride, maleic acid, substituted maleic anhydride, mono-ester of maleic anhydride, itaconic anhydride, itaconic acid, substituted itaconic anhydride, monoester of itaconic acid, fumaric acid, fumaric anhydride, fumaric acid, substituted fumaric anhydride, monoester of fumaric acid, crotonic acid and its derivatives, acrylic acid, and methacrylic acid. While not being bound by any theory, it is believed that the anhydride groups react faster with the hydroxyls on the nanoclay surface so as to create points of interaction that facilitate the observed changes and enhancements in thermal and mechanical properties. Moreover, it is believed that anhydride groups are more reactive that acid groups with the clay surface bound hydroxyl groups, and therefore are a more preferred hydrophilic moiety.

The hydrophilic moiety comprises 0.5 to 20 weight percent, and more preferably from 8 to 12 percent by weight of the polymeric process aid. The hydrophilic moiety may be a monomer polymerized into the polymeric backbone, or added to the polymeric backbone after polymerization, such as through grafting. Preferably the hydrophilic moiety consists of a hydrophilic monomer copolymerized into the polymeric backbone.

The hydrophobic moiety should be highly compatible with the thermoplastic matrix polymer. For example, in the case of polar monomers such as amides, acrylics, esters, vinyls and ethers the preferred hydrophobic moieties include, but are not limited to $C_{1-8}$ alkyl acrylates and methacrylates, vinyl acetate, poly(vinylchloride), and chlorinated polyethylene. A preferred hydrophobic moiety is methyl methacrylate or vinyl acetate.

The polymeric process aid of the invention contains two or more monomeric species, and may be a copolymer, a terpolymer, or contain more than three monomeric species. In one preferred embodiment, a terpolymer of maleic anhydride, styrene, and methyl methacrylate is used as the process aid. The maleic anhydride is used as the hydrophilic moiety, the styrene monomer is used to facilitate the polymerization of the maleic anhydride and also for its lubricant effect, and the methyl methacrylate is used as the hydrophobic moiety. Alternatively, the maleic anhydride can be partially reacted as a partial ester; the styrene could be a functionalized styrene, such as alpha methyl styrene; and the maleic anhydride could be a dicarboxylic acid or anhydride. The maleic anhydride is present at from 0.5 to 20, preferably 5-15 and more preferably 8-12 weight percent; the styrene is present at a level about twice that of the maleic anhydride, or from 1 to 40, preferably 10-30, and more preferably 16-24 weight percent; and the methyl methacrylate present at from 40 to 98.5, preferably 55-85 and more preferably from 64 to 76 weight percent of the process aid.

The weight average molecular weight of the polymeric process aid is from 2,500 to 250,000, preferable from 10,000 to 250,000, and more preferably from 25,000 to 150,000 when made by typical polymerization methods such as solution, bulk, suspension, and emulsion polymerization. The molecular weight could go up to 3,000,000 if the polymer synthesis is by emulsion polymerization. Generally solution polymerization is used for polymerization of the preferred anhydride monomers. The polymeric process aid of the invention may have any polymer architecture, including random, gradient, branched, or block.

Block polymers may be made using controlled radical polymerization methods known in the art. Both di- and triblock polymers work as process aids of the invention. In one embodiment a bis-alkoxyamine initiator is used to obtain a triblock structure, with a nitroxide to control the reaction kinetics. In a block polymer, the styrene and maleic anhydride are polymerized to form a polymeric macroinitiator (B), and the methylmethacrylate (A) is then added to form an A-B-A triblock copolymer.

Gradient process aids may be synthesized in a one-pot fashion without separating the macroinitiators as for block copolymer synthesis. In one embodiment a controlled radical polymer technique is used to form a styrene-co-maleic anhydride copolymer, and prior to full conversion a methylmethacrylate monomer stream is started. In addition to the ease of preparation, gradient copolymers offer similar structural types to block copolymers.

Random polymeric process aids of the invention may be synthesized by radical polymerization methods known in the art. The polymerization may be a bulk, or continuous solution polymerization or reactive extrusion and its variants in which a portion of the monomers and initiator are added to the reactor initially, and the remainder are added slowly over a period of time. The polymerization may also be a suspension or emulsion polymerization. The high molecular weight process aid may be used in a solvent as polymerized, or may be dried by means known in the art and made available as a powder, or a pellet.

Use in the Exfoliation of Nanoclays:

Exfoliation of nanoclays typically occurs by a process similar to that disclosed in U.S. Pat. No. 6,462,122, incorporated herein by reference. In the process, typically onium ions are intercalated between the layers of phyllosilicates, optionally with a coupling agent such as a silane, titanate, aluminate and/or zirconate. The intercalation expands the interlaminar spacing of the adjacent platelet layers. Subsequently an organic compound, possibly a monomer, oligomer or polymer, is intercalated. The intercalated monomer may undergo polymerization in situ. The intercalate may then be sheared to exfoliate the intercalate into individual platelets.

The “onium” salts used for clay surface modification may be derived from ammonium, phosphonium, imidazolium, or pyridinium cations. The counter anions may be any of typical conjugate base of carboxylic acids, inorganic halide, etc. These “onium” salts may be monomeric, oligomeric, or polymeric in which any plurality of charge and degree of functionalization may be used. Moreover, the inorganic clays may be either pristine or organically modified with “onium” cations bearing either non-reactive or reactive functionality or a combination of both as well. The typical ranges of clay content in the final processed composition typically range from 0.1 wt % to 40 wt %, preferably from 0.5 to 20 and more preferably 1 wt %-5 wt %. Alternatively, a clay concentrate, or “masterbatch” may be employed for which the clay content typically ranges from 10 wt % to 60 wt %, with 35 wt %-45 wt % being preferred. The masterbatch can then be diluted in the final formulation to give the preferred from 1 wt % to 5 wt % content previously discussed.

The edges and surfaces of phyllosilicates are known to have many hydroxyl groups, which make the intercalation of non-polar and low polar molecules difficult. Clay sheet surface hydroxyls, though not as reactive, are also available for reaction/interaction. In addition, the onium groups bear a similar functionality. The copolymer process aid of the present invention, having hydrophilic moieties, can easily intercalate into the phyllosilicate, with or without the onium ion intercalation. This allows the copolymer process aid to be used as the sole intercalation material.

The greatest materials performance benefits are often achieved with complete clay platelet exfoliation, however, a distribution in the degree of clay platelet exfoliation may be sufficient depending on the performance characteristics desired. The composition of process aid, i.e. the constituent monomeric units, present the opportunity of significantly improving or controlling miscibility characteristics to manipulate resultant optical, mechanical, and thermal properties.

Additionally, since the process aid copolymer is amphiphilic—having both hydrophilic and hydrophobic moieties, it can aid in the sorbtion and intercalation of both polar, non-polar and low-polar molecules, monomer, oligomers and polymers.

In one embodiment, a mixture of 0.5-20 weight percent of an ethylenically unsaturated carboxylic acid or anhydride; 1-40 weight percent of styrene; and 40 to 98.5 weight percent of a 95-99 weight percent methylmethacrylate/1-5 weight percent $C_{1-4}$ alkyl acrylate monomer blend, is intercalated into Laponite or other phyllosilicate—with or without a prior onium ion intercalation. The incalated monomer mixture is then polymerized in situ. It was found that the use of minor levels of maleic anhydride in a methyl methacrylate/ethyl acrylate monomer mixture provided a reactive functionality that helped to achieve a dispersed, exfoliated structure and minimize positional movement of the clay particles in a polyvinyl-chloride matrix.

Use as the Compatibilizing Aid for Incorporation of Modified Nanoclays into a Polymer Matrix:

Another use for the copolymer process aid or additive of the present invention is as an additive used to incorporate intercalated and exfoliated nanoclays into a thermoplastic polymer matrix.

While not being bound by any particular theory, it is believed that the hydrophilic moiety of the copolymer process aid will either a) react with the hydroxyl groups on the nanoclay through esterification; b) form hydrogen bonds with the hydroxyl groups; and/or c) form crosslinks between the thermoplastic matrix and the surface of the nanoclay.

Figure 2:
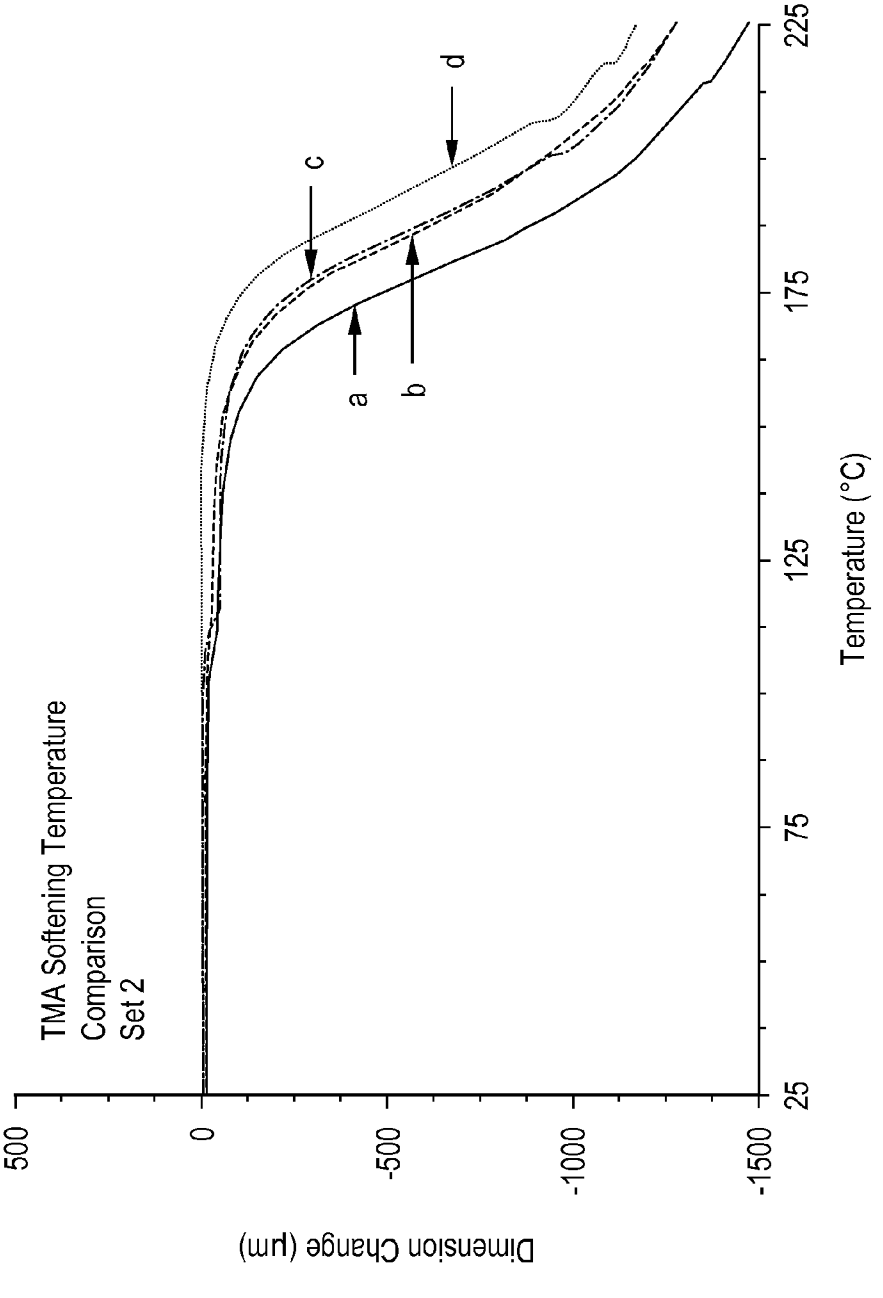
FIG. 2: TMA graph showing dimension change versus temperature of the compression molded samples in FIG. 1 after aging.
Figure 3:
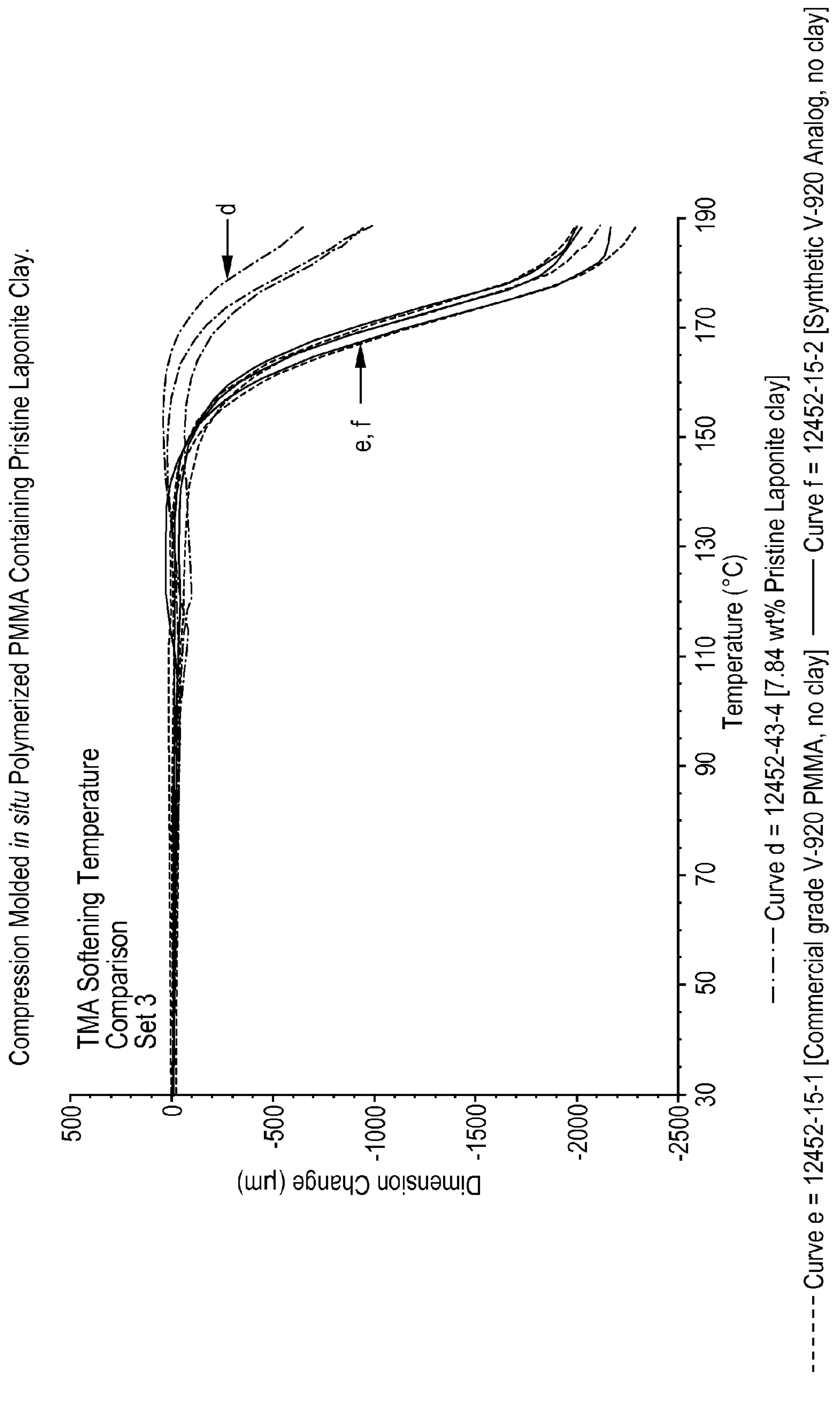
FIG. 3: TMA graph showing dimension change versus temperature of compression molded samples containing PMMA and pristine laponite clay at a level of 7.84 wt % (curve d) versus compression molded samples containing PMMA with no clay (curves e and f).
Figure 4:
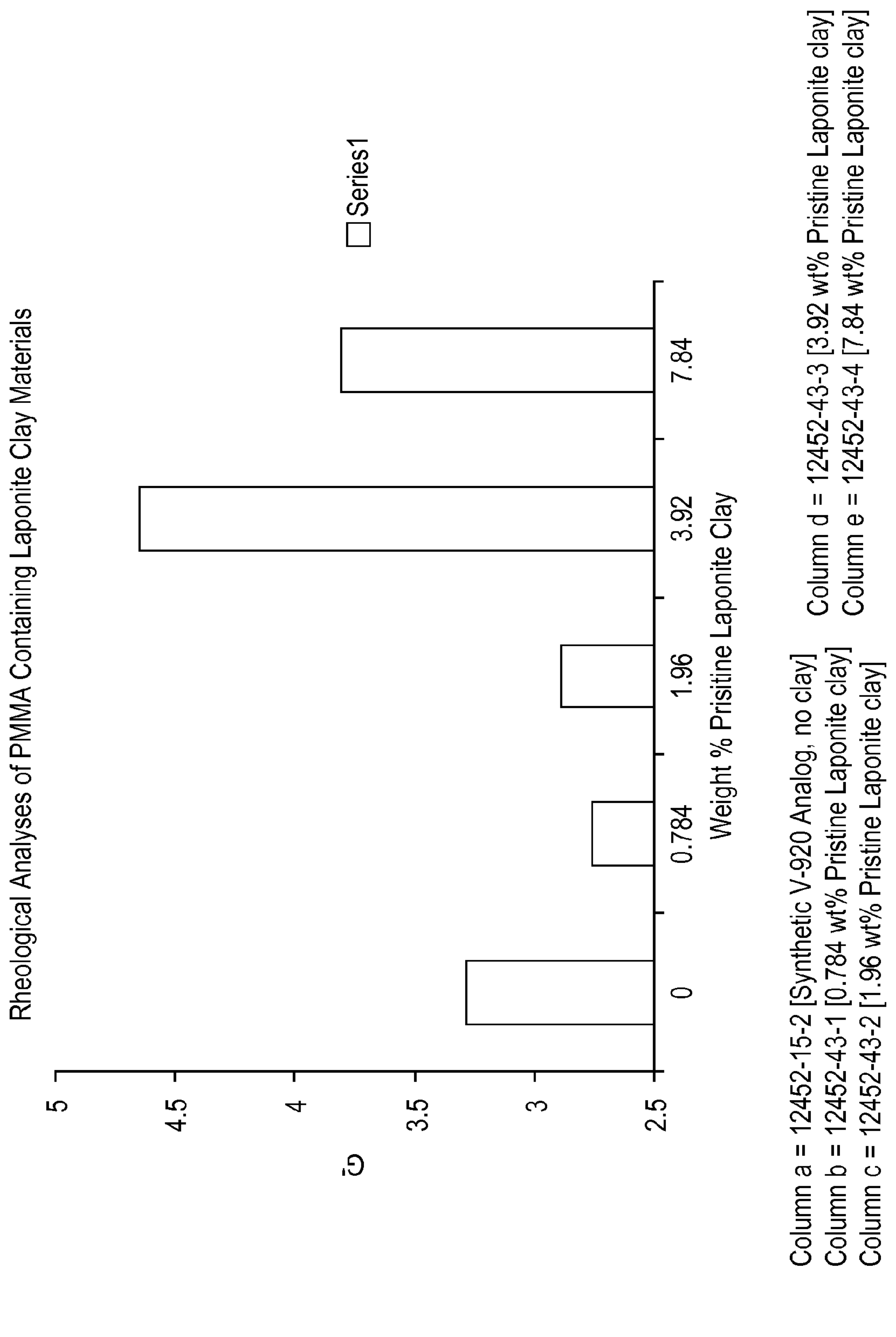
FIG. 4: Histogram showing plateau modulus (G' in Pa×$\mathbf{10}^5$) of PMMA samples containing varying levels (in wt %) of pristine laponite clay.

In the absence of reactive groups such as the anhydride unit, the clay sheets, although exfoliated in the melt can collapse and reaggregate in the solid state thus significantly reducing the effectiveness of the added clay and giving rise to minimal materials properties enhancements. Therefore it is expected that maleic anhydride-bearing PMMA copolymers through complimentary reaction will also stabilize the higher-ordered, exfoliated structures in the solid state. The same behavior may be expected for core-shell and styrene-butadiene-methacrylate (SBM)-type systems in which optimal properties arise from the greatest degree of dispersion within a polymeric host in the solid state. Preliminary data suggests that even pristine Laponite, a synthetic phyllosilicate clay dispersed in PMMA can have marked impact on desirable properties such as heat distortion as shown in the TMA analyses of FIGS. 1-3. Compression molded samples of freshly extruded material (FIG. 1) show a significant dimensional increase upon heating that has been attributed to the relaxation of clay particle stresses, i.e. their increased order or registry arising from sample preparation. After aging, these stresses subside through some type of annealing or relaxation process whereby the particles can be expected to lose registry as shown in FIG. 2. In the absence of any clay added, no such behavior can be expected as shown in FIG. 3. The incorporation of dispersed Laponite clay particles significantly alters the observed plateau modulus values for a series of PMMA-Laponite nanocomposites as shown in Table 1 and shown graphically in the histogram of FIG. 4. Such changes in plateau modulus are often accompanied by a concomitant reduction in polymer chain mobility and an increase in the effective chain entanglement molecular weight (Kopesky et al. *Macromolecules* 2004, 37, 8992-9004). With the incorporation of the terpolymer PD-1063 further melt viscosity enhancements (Table 2). Further increases in ductility shown by an increase in elongation at break and a corresponding increase in tensile strength (Table 3)

Typically the copolymeric process aid is present in the nanoclay modified polymer composition at 0.5-15, preferably 1-10, and more preferably at 1.5-7.5 weight percent, based on the weight of the aggregate weight of the process aid-nanoclay compounded material.

The modified nanoclay may be modified with onium ions, organic solvents, monomers, oligomers, or polymers. In one embodiment, the clay is modified with a composition of 0.5-20 weight percent of an ethylenically unsaturated carboxylic acid or anhydride; 1-40 weight percent of styrene; and 40 to 98.5 weight percent of a 95-99 weight percent methylmethacrylate/1-5 weight percent $C_{1-4}$ alkyl acrylate monomer blend.

The nanoclay modified polymer matrix will typically contain from 5-90, to 95-10 weight percent of nanoclay to polymer matrix. More typically the modified nanoclay is present at 5-50 weight percent and the polymer matrix at 50 to 95 weight percent.

Thermoplastic polymer matrix materials with which the copolymer process aid of the invention may be used to compatibilize a modified nanoclay include thermoplastic polyolefins, thermoplastic polyurethanes, and thermoplastic elastomers including but not limited to: polycarbonate, polyester, polystyrene, styrene/acrylonitrile copolymer, poly(vinyl chloride), chlorinated poly(vinyl chloride), polyamide, imidized acrylic polymer, poly(lactic acid), poly(butylene-terephthalate) (PBT), linear PBT, cyclic PBT, glycol modified PBT, polyvinylidene fluoride, poly(vinylidene chloride), acrylonitrile-butadiene-styrene (ABS), or an acrylic polymer, and the copolymers thereof. A preferred thermoplastic polymer matrix an acrylic polymer or a polyamide. The acrylic polymer matrix can be any acrylic homopolymer or copolymer, or blends thereof.

The nanoclay-modified polymer composition may be formed via in-situ polymerization, solution casting, melt-intercalation, and/or extrusion and reactive extrusion depending on the base resin employed and the final material or article to be fabricated. Moreover, either a direct or a masterbatch, clay concentrate formulation approach may be used depending on the specific materials, processing, or application requirements The nanoclay-modified matrix polymer may be formed into useful articles, films, sheets and profiles by means known in the art, such as by continuous processes such as extrusion, co-extrusion, lamination, or batch processes such as calendaring or batch mixing.

Due to their relatively high Tg and good thermal and mechanical properties, PMMA and its copolymers are often blended with other materials such as PVC to improve heat distortion and other thermal and mechanical properties, while maintaining the very desirable property of optical clarity or transparency.

In one embodiment of the invention, the copolymer process aid is added to the matrix along with other additives, such as impact modifiers—both block copolymers and core/shell impact modifiers. The copolymer process aid acts to compatibilize the nanoclay and the impact modifier and the base resin, allowing for the formation of smaller domain sizes—resulting in a clearer, more transparent structure. The smaller domain sizes, and better dispersion also improve properties, such as thermal stability, and impact modification. In one embodiment, a SBM (styrene, butadiene, methylmethacrylate) block impact modifier is used in a nano-clay modified thermoplastic matrix, along with the copolymer process aid of the invention. While not being bound to any particular theory, it is believed that the hydrophilic (MAH) end of the process aid interacts with the hydroxyl groups of the clay, while the hydrophobic end (MMA) can interact with the MMA portion of the impact modifier. The increased compatibility lessens agglomeration of the individual particles due to thermodynamic forces, and produces a more disperse, smaller domain product. Impact modifiers are present in the polymer matrix at 20-80 weight percent, and preferably 15 to 50 weight percent, based on the total weight of matrix polymer, modified nanoclay, impact modifier and copolymer process aid of the invention.

Other additives can also be added to the nanoclay-modified thermoplastic at typical levels, including, but not limited to lubricants, antioxidants, UV and heat stabilizers, colorants, impact modifiers, and other process aids. The amphiphilic copolymer process aid of the invention also helps in the uniform dispersion of these other adjuvants in the polymer matrix, leading to optimization of properties with the most economic levels of additives.

EXAMPLES

Example 1 a) Synthesis of a Random Process Aid (PSt-r-MAH-r-MMA) Polymer I.

A mixture containing 30 grams (0.306 mol) maleic anhydride, 60 grams (0.576 mol) styrene, 210 grams (2.10 mol) methyl methacrylate, 1.5 grams (9.13 mol) azobisisobutyronitrile (AIBN), and 300 grams (3.30 mol) toluene was added to a stainless steel resin kettle under nitrogen (≈20 psi), and heated to 80° C. under vigorous stirring. The temperature was maintained for approximately 6 hours, at which point the reaction had reached 90% conversion as measured by gas chromatography (GC). The reaction mixture was then cooled to room temperature. The residual monomer and toluene was removed by vacuum drying. The Mw=70,100 g/mol, and Mn=34,600 g/mol was determined by SEC analysis as compared to polystyrene standards.

Example 2

Bulk Polymerization of Pristine Laponite Clay in Random P(MMA-co-EA)

A 40 ounce jar was loaded with PMMA V-920 (5 grams), Laponite clay (5 grams), methyl methacrylate (MMA, 87.3 g), and 2.7 grams of ethyl acrylate (EA, 2.7 grams). The jar containing the suspension was then mechanically agitated overnight at room temperature to effect total dispersion of the clay and the PD-1063 terpolymer into the monomer solution as an opaque homogeneous mixture. A chain transfer agent and a suitable peroxide free radical initiator were added and the mixture in the jar again shaken for an additional 30 minutes at room temperature. The resulting mixture was then transferred to a suitable reaction vessel and heated using a temperature range between 60° C. and 120° C. in order to achieve conversion of more than 90% of the MMA to a random PMMA copolymer with EA.

Example 3

Bulk Polymerization of Pd-1063 in MMA-co-EA and Clay Compositions

A 40 ounce jar was loaded with terpolymer PD-1063 (5 grams), Laponite clay (5 grams), methyl methacrylate (MMA, 87.3 g), and 2.7 grams of ethyl acrylate (EA, 2.7 grams). The jar containing the suspension was then mechanically agitated overnight at room temperature to effect total dispersion of the clay and the PD-1063 terpolymer into the monomer solution as an opaque homogeneous mixture. A chain transfer agent and a suitable peroxide free radical initiator were added and the mixture in the jar again shaken for an additional 30 minutes at room temperature. The resulting mixture was then transferred to a suitable reaction vessel and heated using a temperature range between 60° C. and 120° C. in order to achieve conversion of more than 90% of the MMA to a random PMMA copolymer with EA. After polymerization, each sample was cryoground to a granular solid and then melt processed at 225° C. in the melt for 10 minutes in a co-rotating twin screw mixer at 100 rpm under a rapid flow of $N_2$. The resulting materials were then evaluated as follows. Dynamic mechanical analysis testing was performed at a frequency of 1 Hz, a heating rate of 5° C. per minute, and at strain values ranging from 0.03 to 0.3%. All testing was conducted under a nitrogen atmosphere, with the elastic modulus values determined at 25° C. The product (sample 13002-72-3-r4 of Table 1) showed significantly enhanced thermal and mechanical properties.

All samples melt-processed at 240° C. at 100 rpm for 10 min under an $N_2$ atmosphere.

DATA TABLE 1

Plateau Modulus Values for PMMA Containing Laponite Clay Particles

| Sample | Composition wt % PMMA-V920 | MMA | EA | Wt % Laponite | G' [Pa] × $10^5$ |
|---|---|---|---|---|---|
| PMMA V-920 | 100 | 0 | 0 | 0.0 | 5.21 |
| 12452-15-2 | 14 | 83.42 | 2.58 | 0.0 | 3.27 |
| 12452-43-1 | 14 | 82.66 | 2.56 | 0.784 | 2.76 |
| 12452-43-2 | 14 | 81.52 | 2.52 | 1.96 | 2.89 |
| 12452-43-3 | 14 | 79.62 | 2.46 | 3.92 | 4.65 |
| 12452-43-4 | 14 | 75.82 | 2.34 | 7.84 | 3.81 |

Notes:
1. The plateau modulus values are also shown graphically in the histogram, FIG. 4.
2. Conventional oscillatory measurements were conducted at 160° C. under $N_2$.

DATA TABLE 2

Rheological Analyses of Random Terpolymer Derived Materials.[1]

| Sample | Description[2] | Angular Frequency [$s^{-1}$] | Viscosity [Pa] × $10^3$ |
|---|---|---|---|
| | Pure PMMA V920 | 100 | 2.38 |
| | | 29.3 | 4.77 |
| | | 2.51 | 15.9 |
| | | 0.215 | 23.8 |
| | | 0.0185 | 26.3 |
| | | 0.01 | 27.1 |
| 13002-72-6-r4 | Pure PD-1063. | 100 | 1.19 |
| | | 29.3 | 2.44 |
| | | 2.51 | 7.64 |
| | | 0.215 | 14.4 |
| | | 0.0185 | 21.5 |
| | | 0.01 | 23.6 |
| 13002-72-7-r4 | 5 wt % Laponite clay. | 100 | 1.16 |
| | 95 wt % PD-1063. | 29.3 | 2.39 |
| | | 2.51 | 7.28 |
| | | 0.215 | 12.3 |
| | | 0.0631 | 13.4 |
| 13002-72-4-r3 | Dry Blend[3] | 100 | 1.75 |
| | 5 wt % Laponite clay. | 29.3 | 3.79 |
| | 5 wt % PD-1063. | 2.51 | 12.0 |
| | 90 wt % PMMA V-920. | 0.215 | 19.8 |
| | | 0.0185 | 24.6 |
| 13002-72-3-r4 | In situ polymerization[4] | 100 | 4.67 |
| | 2.5 wt % Laponite clay. | 29.3 | 13.9 |
| | 5 wt % PD-1063. | 2.51 | 118.0 |
| | 92.5 wt % MMA/EA. | 0.215 | 914.0 |
| | Peroxide initiation | 0.0185 | 6280.0 |
| | | 0.01 | 9830.0 |
| 13002-72-4-r4 | In situ polymerization[4] | 100 | 4.67 |
| | 5 wt % Laponite clay. | 29.3 | 13.9 |
| | 5 wt % PD-1063. | 2.51 | 118.0 |
| | 90 wt % MMA/EA. | 0.215 | 914.0 |
| | Peroxide initiation. | 0.0185 | 6280.0 |
| | | 0.01 | 9830.0 |

Notes:
[1]Conventional oscillatory measurements were conducted at 200° C. under $N_2$.
[2]Composition and preparation of material melt processed at 225° C. for 10 minutes at 100 rpm in a small-scale DSM co-rotating twin screw melt extruder. All samples were dried in a vacuum oven overnight at 65° C. before melt processing.
[3]Individual, pure components mixed together, cryoground, and then melt processed.
[4]In situ polymerization refers to the swelling of the clay in a liquid mixture of MMA containing 3 wt % EA (relative to MMA) with mechanical mixing overnight. The PD-1063 was added to increase dissolved solution viscosity and stabilize the clay suspension.

DATA TABLE 3

Mechanical Analyses of PD-1063 Random Terpolymer Derived Materials.

| Sample | Wt % Laponite | Wt % PD-1063 | Wt % P[MMA-co-EA] | Stress at Break [MPa} | Strain at Break [%] |
|---|---|---|---|---|---|
| PMMA V-920 | 0 | 0 | 100 | 1.3 | 15.3 |
| 13002-72-6-r4 | 0 | 100 | 0 | 0.4 | 4.1 |
| 13002-72-7-r4 | 5.0 | 95 | 0 | 0.4 | 5.0 |
| 13002-72-4-r3 | 5.0 | 5.0 | 90.0 | 0.8 | 11.4 |
| 13002-72-3-r4 | 2.5 | 5.0 | 92.5 | 2.4 | 24.8 |
| 13002-72-4-r4 | 5.0 | 5.0 | 90.0 | 2.4 | 20.5 |

Notes:

1. Used in-house developed high-throughput mechanical properties measurement instrument, the values of which are not yet normalized against a calibration curve.
2. Data presented is raw data acquired directly from instrument.
3. For each sample, the reported value is a statistical average of 10 data points acquired from the surface of a 100 □ compression molded film.

What is claimed is:

1. A nanocomposite composition comprising:

a) from 0.5 weight percent to 50 weight percent of an exfoliated layered silicate material;

b) from 0.5 to 15 weight percent of a copolymer, wherein said copolymer has a weight average molecular weight from 2,500 to 250,000 and consists essentially of:

(1) 0.5 to 20 percent by weight of monomer units selected from the group consisting of ethylenically unsaturated carboxylic acids, ethylenically unsaturated carboxylic acid anhydrides, and derivatives thereof;

(2) 1 to 40 percent by weight of monomer units selected from styrene and functionalized styrene; and (3) 40 to 98.5 percent by weight of monomer units selected from the group consisting of $C_{1-8}$ alkyl acrylates and methacrylates, and vinyl acetate;

c) from 10 to 90 weight percent of a thermoplastic polymer or copolymer matrix; and d) one or more additional additives, including at least one impact modifier;

wherein the total of a), b), c) and d) adds up to 100 weight percent.

2. The nanocomposite composition of claim 1, comprising a) from 1 to 40 weight percent of an exfoliated layered silicate material;

b) from 0.5 to 15 weight percent of a copolymer, wherein said copolymer has a weight average molecular weight from 10,000 to 250,000 and consists essentially of:

(1) 0.5 to 20 percent by weight of monomer units selected from the group consisting of ethylenically unsaturated carboxylic acids, ethylenically unsaturated carboxylic acid anhydrides, and derivatives thereof;

(2) 1 to 40 percent by weight of monomer units selected from styrene and functionalized styrene; and (3) 40 to 98.5 percent by weight of monomer units selected from the group consisting of $C_{1-8}$ alkyl acrylates and methacrylates, and vinyl acetate;

c) from 50 to 90 weight percent of a thermoplastic polymer or copolymer matrix; and d) one or more additional additives, including at least one impact modifier;

wherein the total of a), b), c) and d) adds up to 100 weight percent.

3. The nanocomposite composition of claim 1 comprising from 5 to 80 weight percent of one or more impact modifiers.

4. The nanocomposite composition of claim 1 wherein said thermoplastic polymer or copolymer matrix (c) is selected from the group consisting of thermoplastic polyolefins, thermoplastic polyurethanes, thermoplastic elastomers, polycarbonate, polyester, polystyrene, styrene/acrylonitrile copolymer, poly(vinyl chloride), chlorinated poly(vinyl chloride), polyamide, imidized acrylic polymer, poly(lactic acid), linear poly(butyleneterephthalate) (PBT), cyclic PBT, glycol modified PBT, polyvinylidene fluoride, poly(vinylidene chloride), acrylonitrile-butadiene-styrene (ABS), an acrylic polymer, and the copolymers thereof.

5. The nanocomposite composition of claim 4 wherein said thermoplastic polymer or copolymer matrix comprises an acrylic polymer or a polyamide.

6. The nanocomposite composition of claim 1 wherein the copolymer b) is a terpolymer of maleic anhydride, styrene and methyl methacrylate.

7. The nanocomposite composition of claim 1 wherein the copolymer b) consists essentially of:

(1) 5 to 15 percent by weight of maleic anhydride monomer units;

(2) 10 to 30 percent by weight of styrene monomer units; and (3) 55 to 85 percent by weight of methyl methacrylate monomer units.

8. The nanocomposite composition of claim 1 wherein the copolymer b) consists essentially of:

(1) 8 to 12 percent by weight of maleic anhydride monomer units;

(2) 16 to 24 percent by weight of styrene monomer units; and (3) 64 to 76 percent by weight of methyl methacrylate monomer units.

9. The nanocomposite composition of claim 1 wherein the copolymer b) has a weight average molecular weight from 10,000 to 250,000.

10. The nanocomposite composition of claim 1 wherein the copolymer b) has a weight average molecular weight from 25,000 to 150,000.

11. The nanocomposite composition of claim 1 wherein the copolymer b) has a random polymer architecture.

12. The nanocomposite composition of claim 1 wherein the nanocomposite composition includes a block copolymer impact modifier.

13. The nanocomposite composition of claim 1 wherein the nanocomposite composition includes a core/shell impact modifier.

14. The nanocomposite composition of claim 1 wherein the nanocomposite composition includes an SBM (styrene, butadiene, methyl methacrylate) block impact modifier.

15. The nanocomposite composition of claim 1, wherein the copolymer b) is made by solution polymerization.

16. A nanocomposite composition comprising:

a) from 1 weight percent to 40 weight percent of an exfoliated layered silicate material;

b) from 0.5 to 15 weight percent of a copolymer, wherein said copolymer has a weight average molecular weight of from 25,000 to 150,000, and consists essentially of:

(1) 5 to 20 percent by weight of maleic anhydride monomer units;

(2) 10 to 30 percent by weight of styrene monomer units; and (3) 55 to 85 percent by weight of methyl methacrylate monomer units;

c) from 50 to 90 weight percent of a thermoplastic polymer or copolymer matrix comprising an acrylic polymer; and d) one or more additional additives, including at least one impact modifier selected from the group consisting of block copolymer impact modifiers and core/shell impact modifiers;

wherein the total of a), b), c) and d) adds up to 100 weight percent.

* * * * *